Oct. 19, 1965 J. W. CARR 3,213,457

ZIG-ZAG ANTENNA

Filed July 6, 1961 6 Sheets-Sheet 1

INVENTOR.
JOHN W. CARR
BY George C. Sullivan
Agent

Oct. 19, 1965

J. W. CARR 3,213,457

ZIG-ZAG ANTENNA

Filed July 6, 1961

6 Sheets-Sheet 2

INVENTOR.
JOHN W. CARR
BY
George C. Sullivan
Agent

Oct. 19, 1965 J. W. CARR 3,213,457

ZIG-ZAG ANTENNA

Filed July 6, 1961

6 Sheets-Sheet 3

INVENTOR.
JOHN W. CARR
BY George C. Sullivan
Agent

Oct. 19, 1965

J. W. CARR

ZIG-ZAG ANTENNA 3,213,457

Filed July 6, 1961

6 Sheets-Sheet 4

*INVENTOR.*
JOHN W. CARR
*BY* George C. Sullivan
Agent

Oct. 19, 1965 J. W. CARR 3,213,457

ZIG-ZAG ANTENNA

Filed July 6, 1961 6 Sheets-Sheet 5

INVENTOR.
JOHN W. CARR
BY George C. Sullivan
Agent

INVENTOR.
JOHN W. CARR
BY George C. Sullivan
Agent

United States Patent Office 3,213,457
Patented Oct. 19, 1965

3,213,457
ZIG-ZAG ANTENNA
John W. Carr, Santa Clara, Calif., assignor to Lockheed Aircraft Corporation, Burbank, Calif.
Filed July 6, 1961, Ser. No. 122,262
2 Claims. (Cl. 343—806)

This invention relates to an antenna system for radiation or reception of electromagnetic signals and more particularly to a simple, unfurlable zig-zag antenna having relatively constant impedance and radiation pattern characteristics over a large bandwidth and can be made particularly suitable for use with commercial television.

One of the primary difficulties in antenna design for commercial television is that of matching the antenna impedance over the operating bandwidth with the balanced transmission line which has an impedance corresponding to the input impedance of this television set. In addition, considerable difficulty has been encountered in obtaining an antenna system which maintains a uniform radiation pattern over the operating bandwidth.

Extensive efforts have been made to provide inexpensive and simple antenna systems having a relatively constant impedance and relatively uniform radiation patterns over the operating bandwidth so as to maintain losses at a minimum and thereby obtain optimum performance. However, existing antenna systems which have an impedance of the same order of magnitude as that of commercial television receivers have the disadvantage that, while matching the television receiver impedance at one frequency, will have considerable mismatch at other frequencies which may frequently be of the order of several units of decibel losses. In addition, the heretofore developed antenna systems have resulted in considerable radiation pattern variations over the operating bandwidth.

It is recognized in the art that log-periodic antennas realize relatively constant impedance characteristics and maintain a relatively uniform radiation pattern over large bandwidths. However, these log-periodic antennas have been unsuitable for use with commercial television since the impedance characteristics thereof have been much lower than that required for commercial television. That is, commercial television has impedance requirements of the order of about 300 ohms whereas these prior log-periodic antennas have impedances of about 100 ohms or lower which results in considerable impedance mismatch with the balanced line throughout the entire operating bandwidth which is especially untenable in low signal areas. The reason for this low impedance is that in these prior log-periodic antennas it has been considered necessary to interconnect each radiating element of each antenna leg by means of a conducting member which results in capacitive coupling between legs. In addition, it has heretofore been considered necessary to develop log-periodic zig-zag antennas with the antenna legs having some finite angle of separation. Furthermore, it has been the practice to progressively reduce the length of consecutive radiating elements so the last element of each leg is of very small length. Antennas with this configuration require greater structural support for each leg and consume greater space and also increase the cost and complexity of the over-all antenna.

The zig-zag antenna of the present invention obviates the disadvantages of these prior antennas by the discovery that it is unnecessary to maintain an angle between the antenna legs of a zig-zag antenna and that the antenna characteristic impedance is increased by not electrically coupling a long conducting member to the radiating elements down the center line of each leg of the antenna. In this manner an inexpensive and simple antenna system is provided which approximates uniform impedance and radiation pattern characteristics over a broad bandwidth and may be designed to provide characteristic impedance of about 250 to 350 ohms which is highly compatible with the impedance requirement of existing television systems.

Another basic feature of the present invention is the discovery that it is highly advantageous not to progressively reduce the element lengths to very small values since it is then possible to operate in the dominant mode at the lower frequency band and in the first higher order mode in the higher frequency band. By restricting the ratio of the longer to shorter lengths it is possible to provide greater separation between the planes defined by the elements of each leg of the zig-zag antenna and therefore increase the H-plane effective operation which thereby increases the antenna gain over the finite dominant and higher mode bandwidths. By using this technique it is possible to obtain higher gain for a given antenna length than is possible by operating in only the dominant mode. This is particularly adaptable for use with commercial television channels wherein the antenna operates in the dominant mode from frequencies of 54–88 megacycles and in the first higher order mode from 174–216 megacycles. It has also been found that with proper antenna designs it is possible to obtain satisfactory operation in the FM bandwidth (88–108 megacycles).

Furthermore, the present invention provides an antenna which is readily packaged in a small volume since the legs may be furled and packaged with a dielectric member used for mounting the legs. In addition, the antenna system may be easily and correctly assembled since the antenna legs are readily unfurled and rigidly maintained in their proper positions by attaching the legs to the dielectric member at locations which have been pre-established on the dielectric member.

Accordingly, an object of the present invention is to provide a two-dimensional zig-zag antenna.

Another object of the present invention is to provide a zig-zag antenna which is readily unfurled and is capable of being packaged in a small volume.

Still another object of the present invention is to provide a zig-zag antenna which has a characteristic impedance which is highly compatible with commercial television receivers.

A further object of the present invention is to provide a simple and inexpensive zig-zag antenna having relatively constant impedance and uniform radiation pattern characteristics over a large bandwidth.

A still further object of the present invention is to provide a zig-zag antenna wherein the center line points of contiguous radiation elements of each leg are not interconnected by electrically conducting material whereby the characteristic impedance of the antenna is substantially increased.

A still further object of the present invention is to provide a zig-zag antenna having a dielectric member separating the two legs and which is highly compatible for impedance matching with a tapered transmission line.

A still further object of the present invention is to provide a zig-zag antenna capable of operating in both the dominant and first higher order modes which is compatible with the VHF-TV bands.

A still further object of the present invention is to provide a zig-zag antenna which is compatible with both the VHF-TV bands and the VHF-FM band.

A still further object of the present invention is to provide a zig-zag antenna operating in dual modes which makes it possible to obtain higher gain for a given length of structure than when operating in only the dominant mode.

The specific nature of the invention, as well as other objects, uses and advantages thereof, will clearly appear from the following description and from the accompanying drawing in which.

Like numerals designate like elements throughout the figures of the drawings.

Figures 1, 2, 3, 4:
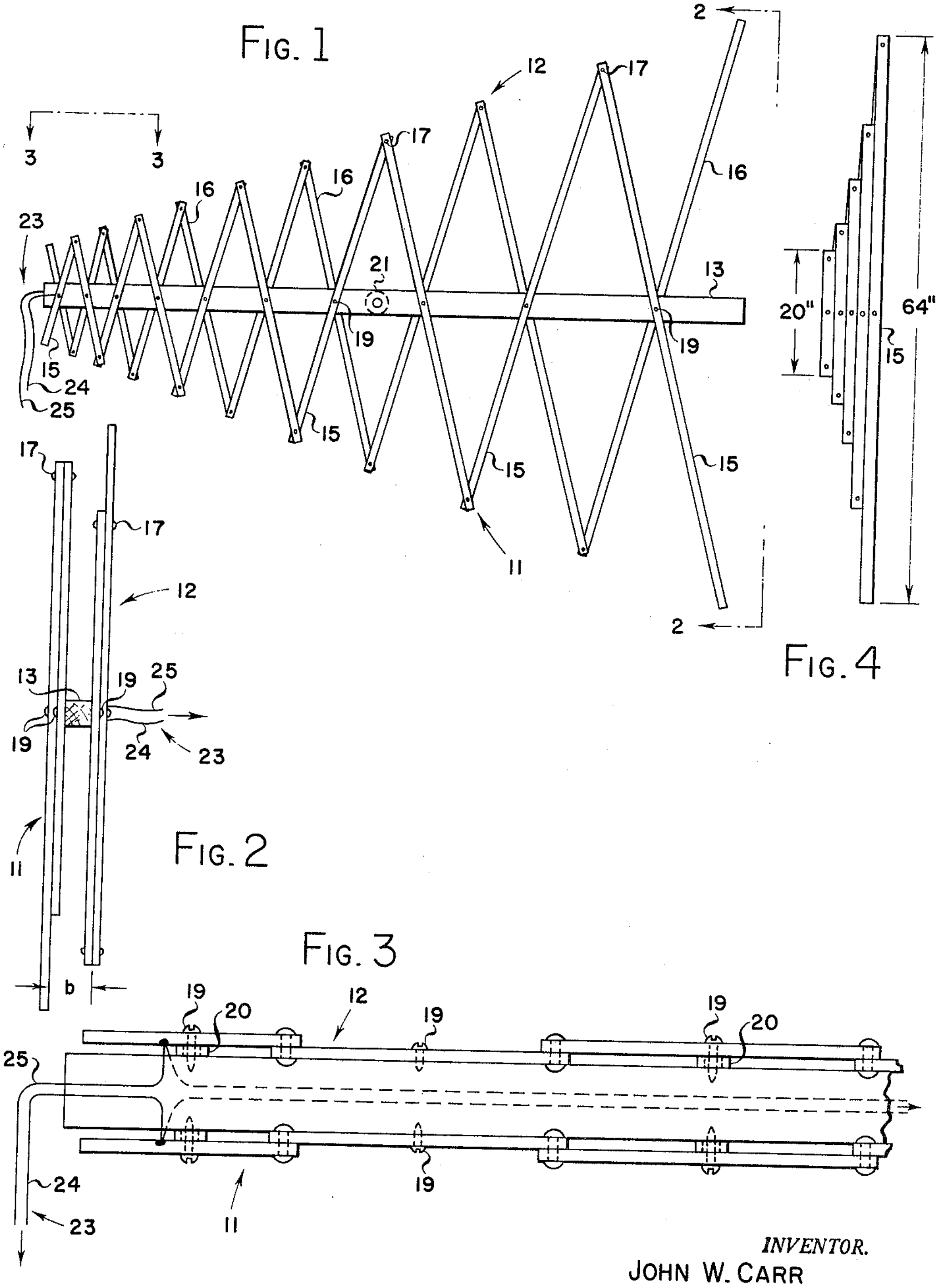
FIGURE 1 is an illustration of the planar log-periodic zig-zag antenna of one embodiment of the present invention.
FIGURE 2 is an end view taken at section 2—2 of FIGURE 1.
FIGURE 3 is a side view taken at section 3—3 of FIGURE 1.
FIGURE 4 is a drawing showing the log-periodic zig-zag antenna of FIGURE 1 in the furled position.

In FIGURES 1, 2 and 3 is illustrated a planar log-periodic zig-zag antenna of one embodiment of the present invention. This antenna includes leg 11 and leg 12 which are spaced apart by and rigidly attached to longitudinally extending dielectric member 13. Legs 11 and 12 respectively consist of a plurality of radiation elements 15 and 16 of progressively decreasing lengths so that when interconnected, each leg forms an envelope angle as hereinafter defined. The length of corresponding radiation elements 15 and 16 of legs 11 and 12 respectively, are equal. These radiation elements may be made of aluminum or other electrical conducting material and may be solid rods, tubes, strips or other shapes which are compatible with the desired performance thereof. The ends of each radiation element are electrically and structurally interconnected by bolts 17 or other suitable fastening means inserted through openings provided at the ends of each interconnected radiation element. It is desirable that sufficient tolerance be provided so the radiation elements may freely rotate about the points of interconnection and thereby render the antenna unfurlable from its collapsed position. In addition, it is desirable that these bolts or fastening means be of the type that when the antenna is unfurled they may be manipulated or adjusted to rigidly hold the radiation elements in fixed relation and in electrical contact with respect to each other.

Legs 11 and 12 are rigidly attached to dielectric support 13 as by means of metal screws 19. As illustrated in FIGURE 3, spacer members 20 may be employed, if desired, to prevent binding of alternate elements of each leg when fastened into place by screws 19. It is necessary to maintain a clearance between the inserted ends of these screws to prevent a direct short or substantial capacitive coupling between legs 11 and 12. In the alternative, a fastener made of dielectric material may be inserted through radiation elements 15 and 16 and support 13 at each of the crossover points. In order to assure that legs 11 and 12 are correctly positioned, support 13 is marked at the locations where it is desired to insert screws 19 or is pre-drilled at the proper locations if dielectric fasteners are employed.

The antenna is mounted by member 21 which may be made of electrical conducting or dielectric material and is rigidly connected to dielectric member 13 and preferably normal to the plane defined by legs 11 and 12. Member 21 may be connected to member 13 at any position along the length thereof; however, it is preferably mounted at the center of gravity to provide maximum strength. When member 21 is made of electrically conducting material it is necessary that it be sufficiently spaced from the radiation elements so as not to provide a direct short or substantial capacitive coupling.

As best depicted in FIGURE 3, the electromagnetic energy transmitted to or received from the antenna, depending upon whether employed as a transmitter or receiver, may be coupled to the small or apex ends of legs 11 and 12 by means of balanced transmission line 23 comprising conductors 24 and 25. In order to prevent conductors 24 and 25 from perturbing the radiation pattern of the antenna they should extend in directions normal to the plane of the electrical signal which is parallel to the plane defined by the radiation elements. In the alternative, balanced transmission line 23 may extend along the length of dielectric support 13, as indicated by the dotted lines in FIGURE 3, to the large end of the antenna and then extend in any convenient direction since the magnitude of antenna fields are small at the large end of the antenna. It is possible to extend the transmission line along support 13 since the plane of the field of conductors 24 and 25 is normal to the plane of the antenna electrical field and induced signals are therefore negligible.

In each of the above methods of transmission line connection, high impedance is realized provided support member 13 is made of dielectric material and the transmission line has matching impedance. If the characteristic impedance of the antenna is made low, by having a conducting member along the center line of each leg conductively coupled to each radiating element of the zig-zag, then the transmission lines should have a lower impedance to match the characteristic impedance of the antenna.

Since the length of member 13, for bandwidths of the order of one octave or greater, will usually be at least one-half the lowest operating frequency wavelength, the antenna of the present invention is particularly suitable for use with a tapered transmission line which is used to match the characteristic impedance of the intenna with a transmitter or receiver having a different impedance. To accomplish this the transmission line would extend along member 13, but rather than having the conductors parallel as shown by the broken lines in FIGURE 3, the conductors would converge or diverge depending upon whether it is desired to increase or decrease the impedance.

In FIGURE 4 is illustrated the collapsed or furled position of the radiating elements which provides an extremely compact arrangement thereby rendering it highly packageable. It should be noted that the length of support 13 may be of the same order of length as the longest radiating elements and may therefore be readily packaged with the furled radiating elements.

Figure 5:
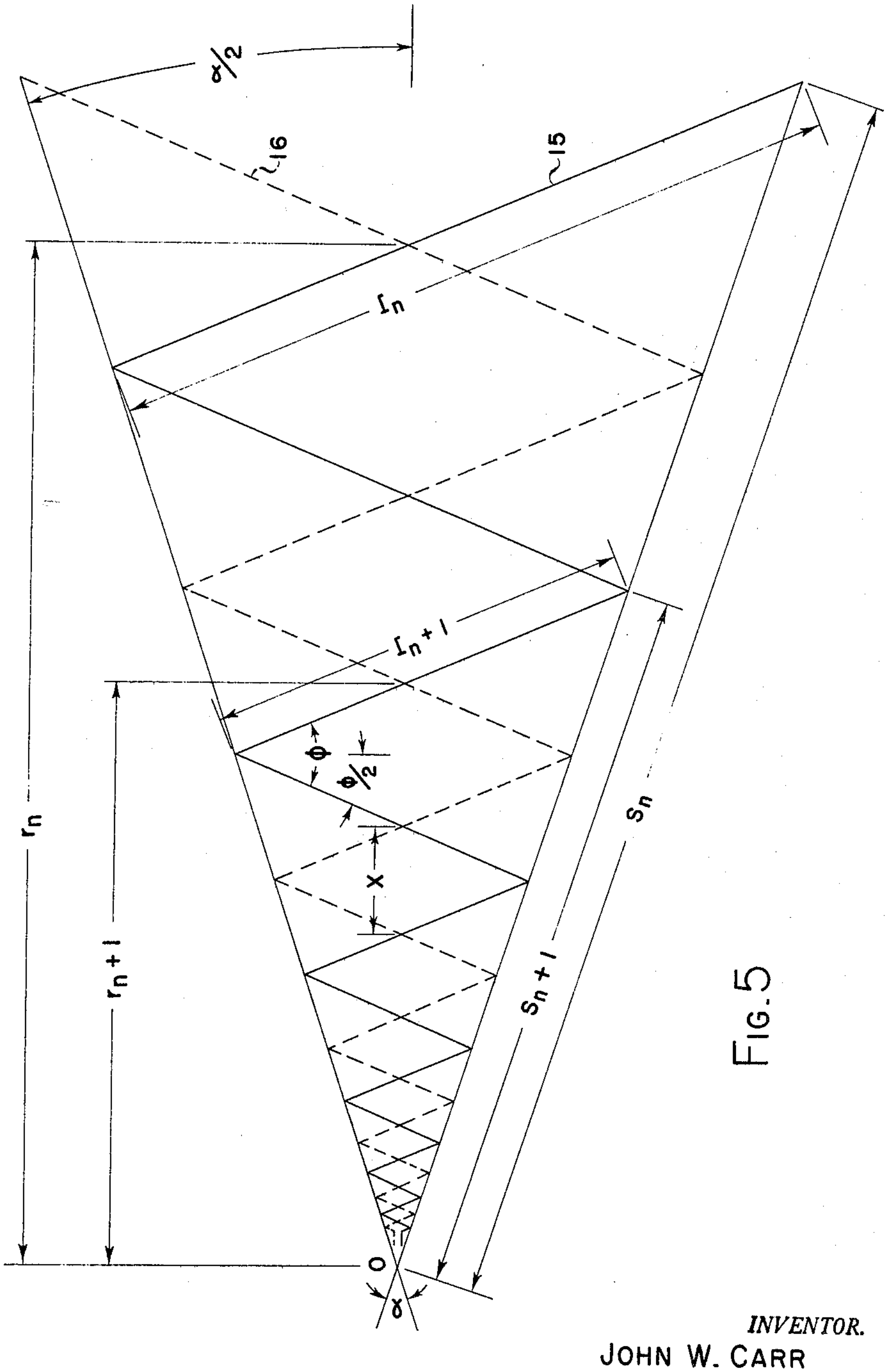
FIGURE 5 is a schematic illustration of the antenna of FIGURE 1 showing the geometrical relations of the radiation elements thereof.

In FIGURE 5 is illustrated the radiation elements and the geometric relations associated therewith of the embodiment shown in FIGURES 1 through 4. Radiation elements 15 are denoted by the solid lines and radiation elements 16 are denoted by dotted lines.

The basic design parameter of the antenna is as follows:

$$\tau=\frac{S_n+1}{S_n}=\frac{l_n+1}{l_n}=\frac{\gamma_n+1}{\gamma_n}$$

where $\tau$ is the design parameter and, to provide a relatively uniform impedance and radiation pattern over the operating bandwidth, should have a value of from about .6 to about .95 depending on the gain and bandwidth desired, allowable length, and angles $\phi$ and $\alpha$. $S_n$, $S_n+1$, $l_n$, $l_n+1$, $\gamma_n$ and $\gamma+1$ are the dimensions shown where the subscript $n$ represents an arbitrarily selected integer. That is, the ratio $$\frac{l_n+1}{l_n}$$

is the ratio of the length of any radiating element in the zig-zag to the next longer parallel radiating element. From the geometry of the antenna, design parameter $\tau$ may be further defined as $$\tau=\left(\frac{1-\tan\frac{\alpha}{2}\tan\frac{\phi}{2}}{1+\tan\frac{\alpha}{2}\tan\frac{\phi}{2}}\right)^2$$

where $\alpha$ and $\phi$ are the angles shown in FIGURE 5.

It should be particularly noted that the distance between crossover points of the two legs of the antenna at the region of operation in the dominant mode should be from about 7 to about 25 percent of the wave length at this region of operation. That is, assuming the antenna is operating in the frequency region of "X" of FIGURE 5, then the length "X" should be within the above defined percentage range for optimum design characteristics. This is because the relative phase relationships and element to element coupling are such as to result in deteriorated radiation patterns when "X" is large or small compared with the 7 to 25 percent region. It is to be understood that this is only an approximate limiting range of "X" for dominant mode operation. For higher modes of operation the optimum range of "X" covers a larger percentage of wavelength. Therefore, with a given value of $\tau$ as a design parameter and since the over-all length of the antenna increases with increase of the above defined "X" percentage, to increase the "X" percentage above 25 percent would merely increase the cost and bulk of the antenna with very little corresponding benefit in dominant mode gain.

Figure 6:
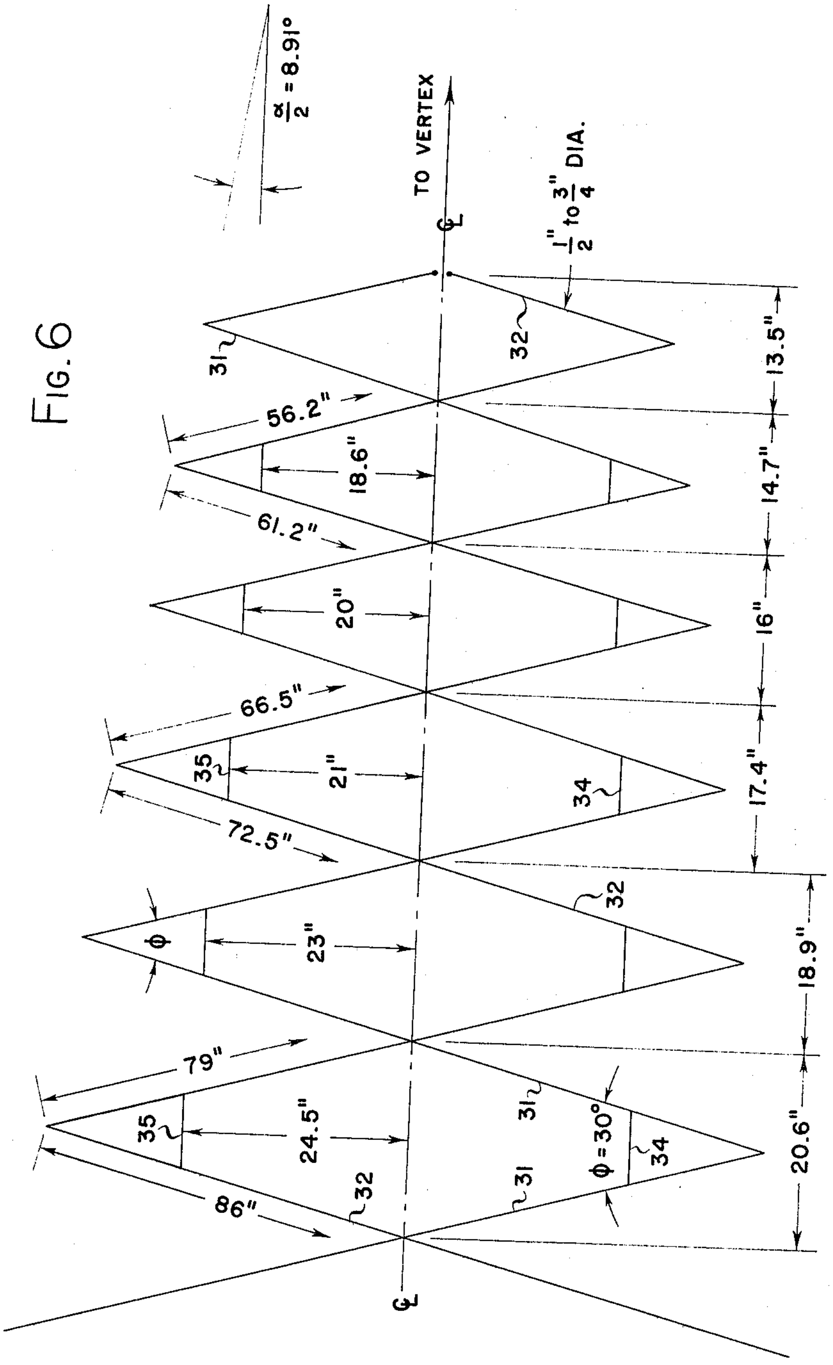
FIGURE 6 is an illustration of another embodiment of the log-periodic zig-zag antenna of the present invention.

In FIGURE 6 is shown another embodiment of the present invention which is a modified planar log-periodic zig-zag antenna which is particularly adaptable to comerical television receivers in that it operates in the lower channel region (54–88 megacycles) in the dominant mode and in the higher channel region (174–216 megacycles) in the first higher order mode, thereby providing higher gain than is obtainable from an equivalent length structure operating in the dominant mode over both the lower and higher frequency bands as in the embodiment shown in FIGURES 1 to 5. The primary difference between this embodiment and the previously described embodiment is that the legs of this embodiment are severely truncated. This makes it possible to realize larger gain for corresponding antenna length in the region of VHF-TV operation. The particular materials and method of construction of the FIGURE 6 embodiment are not shown since they are similar to those shown and described with relation to the embodiment shown in FIGURES 1 to 5.

The antenna schematically depicted in FIGURE 6 includes two planar legs one leg of which consists of radiating elements 31 and the other consists of radiating elements 32. As was the case in the previously described embodiment, these planar legs are spaced apart and rigidly attached to a longitudinally extending dielectric member, not shown. Elements 34 and 35 are used to shunt the tips or vertices of radiating elements 31 and 32, respectively. Elements 34 and 35 are made of electrical conducting material and it is preferable that they be made of the same material as used in radiating elements 31 and 32. The function of these shunting strips is to improve the high frequency performance in that they distribute the electromagnetic excitation over a larger portion of the radiating structure at frequencies of 174 to 216 megacycles which results in higher gain and a higher degree of uniformity of patterns in this operating region. If these shunting elements were placed relatively near the center line of the antenna they will cause considerable variation of impedance over the bands, which as a general rule is undesirable. It is desirable that the spacing between the planes of each zig-zag antenna leg be about six inches; however, this distance may be varied considerably and still remain within the scope of the present invention. In this embodiment it has been found that the gain over most VHF-TV frequencies of operation is about 7 decibels with a resulting efficiency of impedance match of about 90 percent.

The length of each of these radiating elements and the angle between these radiating elements are specifically set forth in FIGURE 6. It is to be understood that considerable departure from these dimensions may be effected and still remain within the scope of the present invention. For example, in the dominant mode it is preferable that the length of radiating elements range from about .35 to about .5 the wave length and in the first higher mode this ratio should be within the range from about 1.2 to about 1.5.

Figure 7:
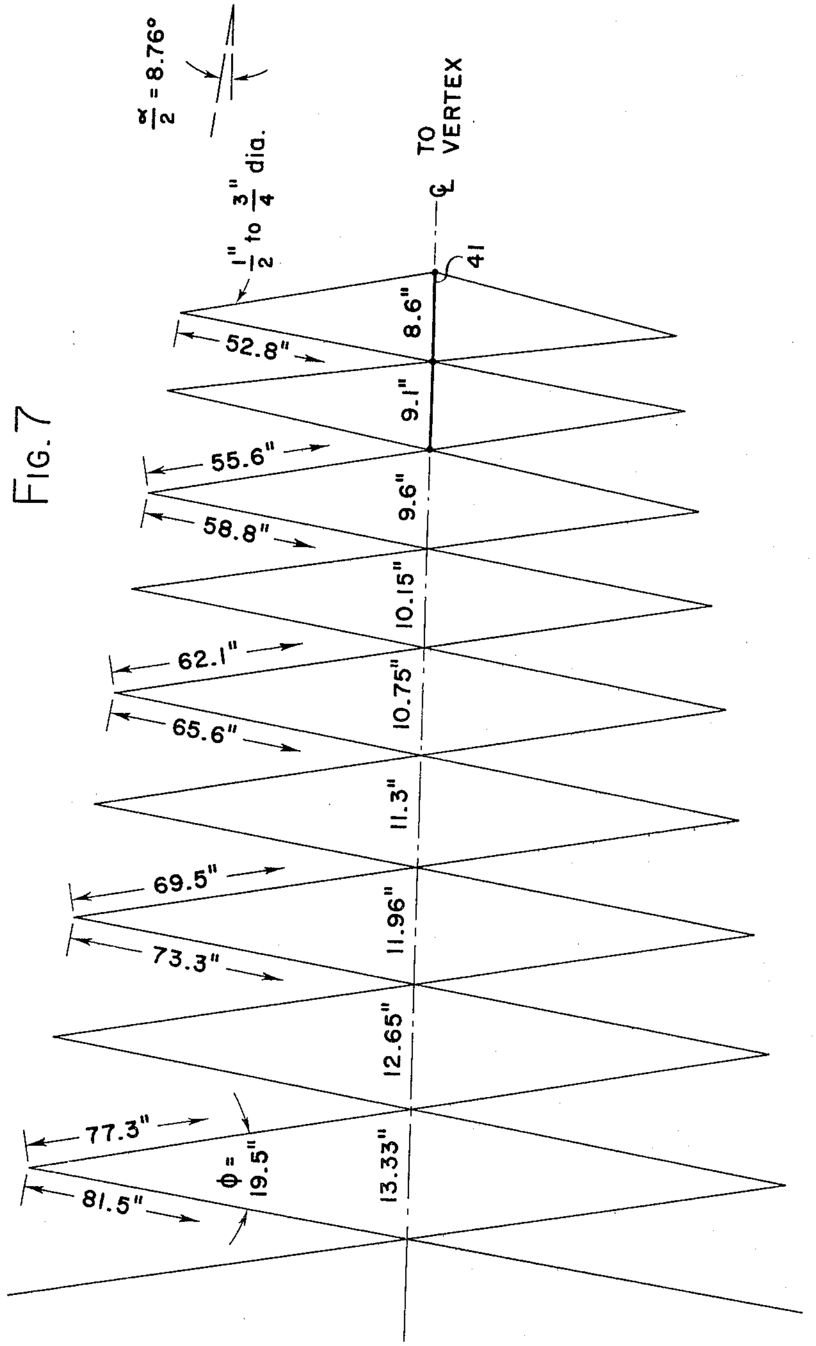
FIGURE 7 is an illustration of another embodiment of the log-periodic zig-zag antenna of the present invention.

In FIGURE 7 is illustrated still another embodiment of the present invention. In this embodiment electrical conducting element 41 is employed to interconnect the radiating elements of each leg at the small end of the antenna as shown. As in the FIGURE 6 embodiment, this embodiment operates in the dominant and first higher order modes of the low and high frequencies, respectively, of VHF-TV. It was found that by employing a larger value of $\tau$ (that is by increasing the number of radiating elements per unit antenna length) that sufficient coupling in the higher order mode of operation is obtained by shunting only the first two elements. In addition, by increasing $\tau$ and coupling in this manner it has been found that a gain of about 8 db is realized in the dominant mode from about 54 to about 102 megacycles and about 7 db gain is realized from about 110 to about 174 megacycles (hybrid operation) and 9 db from about 170 to above 216 (first higher order mode). In FIGURE 7, the particular lengths and angles are illustrated which bring about the above described operation; however, it is to be understood that substantial departure may be made therefrom and still remain within the scope of the present invention. The above gain characteristics were obtained by employing a separation of about 22 inches between the parallel antenna legs and by increasing $\tau$. Increased gain due to the increased separation of the legs is limited by the cross-polarization component due to the conductor extending from each leg to the corresponding transmission line conductor (not shown).

Figure 8:
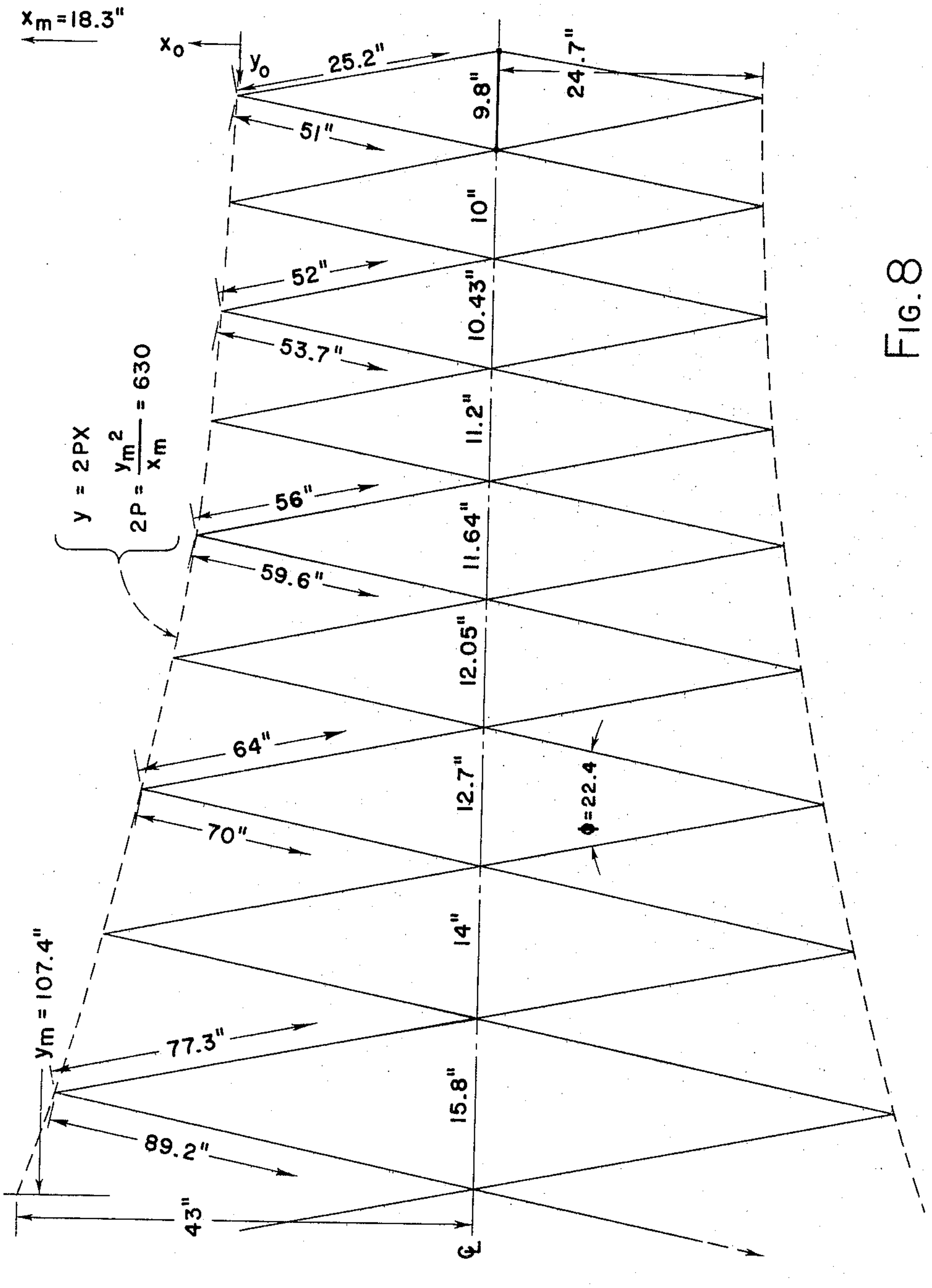
FIGURE 8 is an illustration of another embodiment of the zig-zag antenna of the present invention.

In FIGURE 8 is shown another embodiment of the present invention wherein the envelope of each leg is defined by the equation $y^2=2px$. It has been found that by employing a parabolic envelope as defined by the above equation, rather than a linear constant angle envelope as in the previous embodiments, there is a more gradual transition between the dominant and the hybrid modes wherein the dominant mode has relatively uniform radiation to at least the upper end of the VHF-FM channel (108 megacycles). In operation, there is continuous unidirectional radiation from about 50 to about 220 megacycles with relatively constant impedance characteristics. The gain of this embodiment has been found to be about 8 to 9 db from 54 to 108 megacycles, about 6 to 8 db from 108 to 174 megacycles and about 9 to 10 db from 174 to about 216 megacycles. It will be therefore appreciated that relatively large and uniform gain is realized for all channels of VHF-TV and VHF-FM operations. The particular values selected for the above-described gain characteristics are shown in FIGURE 8; however, there may be considerable departure therefrom and still remain within the scope of the present invention. For example, the gain of the antenna may be increased by increasing the length of the antenna which would result in corresponding change of the value of 2P of the above equation which may also result in readjustment of the value $\phi$.

Figure 9:
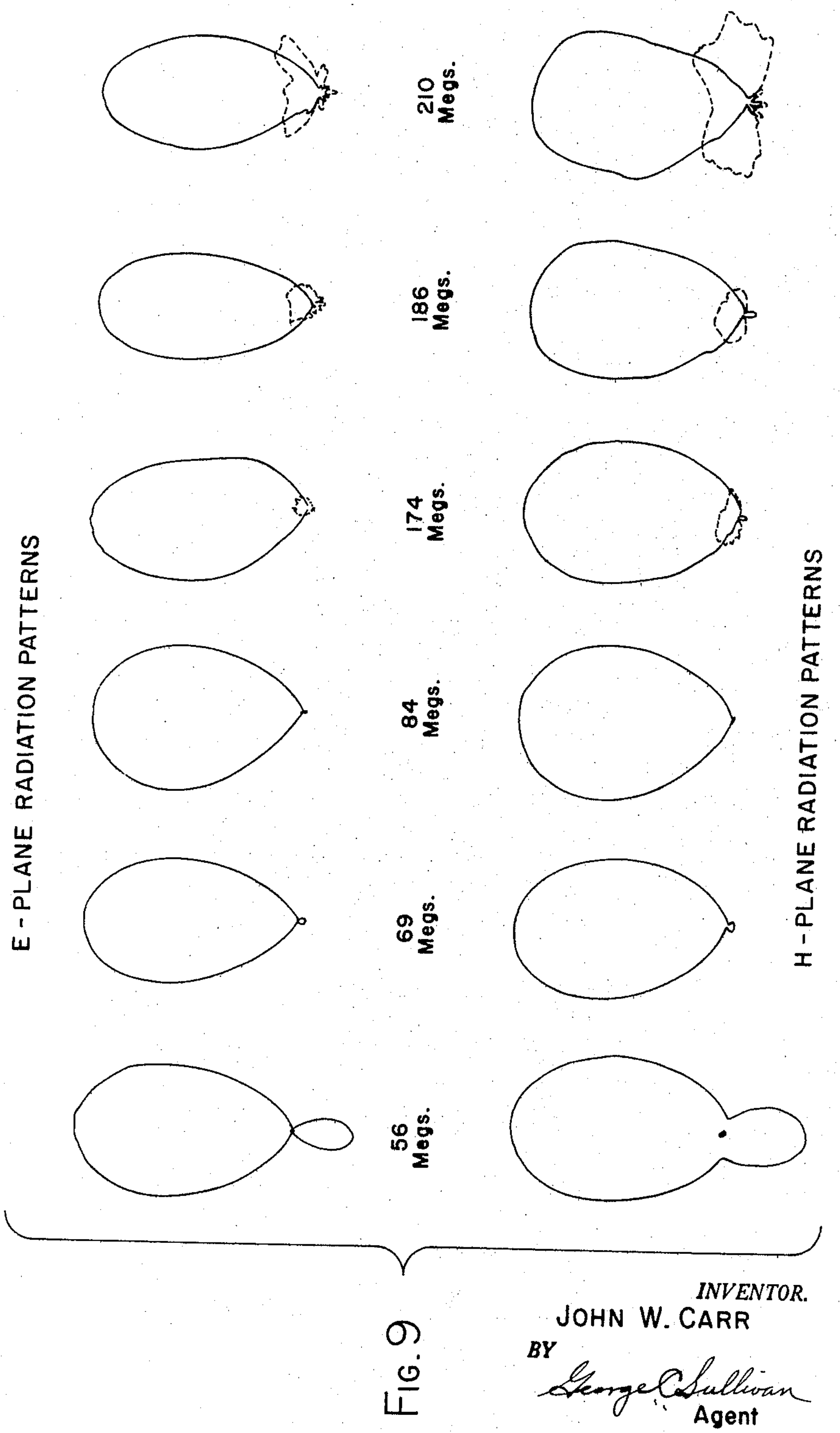
FIGURE 9 illustrates the E and H plane patterns of the embodiment of the present invention shown in FIGURE 9 at frequencies of 56, 69, 84, 174, 186 and 210 megacycles.

In FIGURE 9 are illustrated the E and H plane radiation patterns which have been obtained from operation of the FIGURE 8 embodiment at frequencies of 56, 69, 84, 174, 186 and 210 megacycles and having the design parameters shown thereon. The gain of the antenna is proportional to the inverse product of the E and H plane 3 db beamwidths less the percentage of power in the cross-polarized field which are indicated by dotted lines. From FIGURE 9 it can be seen that at the high VHV-TV frequencies the losses due to the cross-polarized field are not so great as to seriously reduce the antenna gain. As previously indicated, at 210 meagcycles, for example, the gain is about 9 db which takes into account about 1.5 db loss due to cross-polarization.

In summary, by replacing the conventional electrical conducting member connected to the radiating elements by means of a non-conductive member, an antenna is provided having a high impedance characteristic which renders the antenna highly compatible with commercial TV receivers. Another primary feature of the present invention is reducing the planes defined by the antenna legs to an essentially two-dimensional structure. This not only provides a compact antenna but also makes it possible to severely truncate the antenna legs. Truncating of the antenna legs would not be possible unless an essentially two-dimensional structure were employed since each conductor of the transmission line would radiate appreciably and create intolerable cross polarized fields. Since it is now technically feasible to truncate these legs, a higher gain in the dominant and higher order mode of operation is possible for a given length of structure than could be obtained from an equal length of the conventional three-dimensional structure.

It is to be understood in connection with this invention that the embodiments shown are only exemplary, and that various modifications can be made in construction and arrangement within the scope of the invention as defined in the appended claims.

What is claimed is:

1. A zig-zag antenna comprising a first leg having a plurality of radiation elements defining a first plane, a second leg having a plurality of radiation elements defining a second plane, the ends of said radiation elements of each leg defining a parabola, means for maintaining said first and said second planes defined by said radiation elements in equispaced relation.

2. The device of claim 1 wherein said means consists of dielectric material.

References Cited by the Examiner

UNITED STATES PATENTS

| | | | |
|---|---|---|---|
| 2,145,024 | 1/39 | Bruce | 343—908 X |
| 2,737,656 | 3/56 | Cumming | 343—895 X |
| 2,910,694 | 10/59 | Alford | 343—908 |
| 2,977,597 | 3/61 | Du Hamel et al. | 343—908 |
| 3,079,602 | 2/63 | Du Hamel et al. | 343—792.5 |
| 3,108,280 | 10/63 | Mayes et al. | 343—792.5 |

HERMAN KARL SAALBACH, *Primary Examiner.*

ELI LIEBERMAN, *Examiner.*